United States Patent [19]

Ukkonen

[11] Patent Number: 4,657,791

[45] Date of Patent: Apr. 14, 1987

[54] PRODUCT MANUFACTURED OF A ROCK MATERIAL AND A METHOD FOR ITS MANUFACTURING

[76] Inventor: Markku Ukkonen, Kotkankatu 4 B 25, SF-00510 Helsinki, Finland

[21] Appl. No.: 815,590

[22] Filed: Jan. 2, 1986

[30] Foreign Application Priority Data

Jan. 8, 1985 [FI] Finland ............................ 850090

[51] Int. Cl.⁴ ............................................. B44F 9/04
[52] U.S. Cl. ........................................ 428/15; 156/61; 156/71
[58] Field of Search ..................... 428/15; 156/61, 71

[56] References Cited

U.S. PATENT DOCUMENTS

| | | | |
|---|---|---|---|
| 1,537,725 | 5/1925 | Zottoli | 428/15 X |
| 2,751,775 | 6/1956 | Sergovic | 428/703 X |
| 2,949,689 | 8/1960 | Vida | 156/71 X |
| 3,030,234 | 4/1962 | McClinton | 428/413 X |
| 3,056,224 | 10/1962 | Almy et al. | 156/71 X |
| 3,328,231 | 6/1967 | Sergovic | 428/451 |
| 3,396,067 | 8/1968 | Schafer | 428/15 X |
| 3,401,069 | 9/1968 | Lorentzen | 156/71 |
| 3,687,771 | 8/1972 | Meijer | 156/71 X |
| 3,705,830 | 12/1972 | Gurgui et al. | 156/71 |
| 3,836,619 | 9/1974 | Volent | 428/15 X |
| 3,930,088 | 12/1975 | Constantin et al. | 428/237 X |
| 4,022,650 | 5/1977 | Gurgui et al. | 156/498 |
| 4,127,433 | 11/1978 | Gurgui et al. | 156/498 |
| 4,189,414 | 2/1980 | Kikuchi et al. | 428/524 X |
| 4,195,010 | 3/1980 | Russell et al. | 428/454 X |
| 4,405,683 | 9/1983 | Renker | 428/15 X |
| 4,446,177 | 5/1984 | Munoz et al. | 428/15 |

Primary Examiner—Henry F. Epstein
Attorney, Agent, or Firm—Bierman and Muserlian

[57] ABSTRACT

The object of the invention is a rock product and a method for manufacturing the product in a mould The product (1) according to the invention includes a non-transparent, opaque, preferably light reflecting, crystalline and granular rock material, the size of which granules corresponds mainly to the natural crystal size of the rock material in question as well as a mixture comprising a mainly synthetic resin and a mainly transparent filler. Thus, as the mixture (2) forms the transparent coating (4) of the product and binds the rock materials (3) into layers beneath the surface, rock product forms, as the substance hardens, which as such and without any working corresponds to the natural rock material with respect to its reflective properties and its impression of color and depth.

20 Claims, 2 Drawing Figures

PRODUCT MANUFACTURED OF A ROCK MATERIAL AND A METHOD FOR ITS MANUFACTURING

The object of the invention is a product manufactured of a rock material i.e. a rock product as well as a method for manufacturing it. The product is used mainly as a coating.

The natural rock materials are traditionally favoured raw materials in buildingwork, furnishing and interior designing. A beautiful and lasting general impression is achieved by them, but the solution is expensive at the same time, as the rock materials are difficult to machine, which limits the forms of the pieces that can be used. Moreover, the natural rock materials are heavy and thus result in heavy structures as these materials cannot be machined into a too thin piece.

In addition, the pollutants in air have a negative effect on the endurance of the marble used traditionally nowadays.

New methods and products, which try to achieve a surface similar to that of natural rock materials, have been developed. The so called washed concrete, by which the granules of the natural rock material can be brought out on the surface of the concrete, is widely in use. However, the surface is granular and rough, which makes it suitable mainly as a facade. Coloured resinuous concrete structures are also used, but these colour imitations correspond poorly with the appearance of natural rock materials.

The object of the invention is to obviate the drawbacks mentioned above. Especially the object of the invention is to bring about a rock product and a method, by which the heavy and expensive various natural rock material coatings can be completely replaced by a light structured and cheap product, the appearance of which corresponds to that of natural rock materials and which can be easily machined and is more versatile in use than the traditional rock products.

With respect to the characteristic features of the invention reference is made to the claims.

In the method according to the invention the product made of a rock material is manufactured by casting it in a mould which can be of any convenient size and shape according to the purpose in which the product is used. In the method according to the invention, the surface of the mould can be first treated by a detaching substance which ensures the detachment of the product from the mould. After which a mixture of a mainly transparent synthetic resin, which preferably includes a mainly transparent filler, is spread in the mould. In the same way a nontransparent, opaque, preferably light reflecting, crystalline and granular rock material, the size of which granules corresponds mainly to the natural crystal size of the rock material in question, i.e. the size of the granules being larger than 1 mm, preferably from 1 to 10 mm. Thus, the finest fraction of the material has been removed from the used rock material, as this fraction would mix with the used resinous layer and blur it. By proceeding in this manner the smooth surface, which is against the moulds surface, forms mainly as such and without any working a transparent layer on the rock product. The nontransparent rock structure of the rock product can be seen through this layer and corresponds completely to the ground natural rock with respect to its reflection and impression of colour and depth.

It should be noted that the resin can be used without a filler, but it is advantageous to use a filler in order to lower the costs.

In one application of the present invention the rock material used and the resin with its filler are first mixed with each other and the obtained mixture is then casted in a suitable mould. In another application according to the invention the synthetic resin with its filler is first spread on the surface of the mould, after which the rock material is spread over the resin so that the rock material becomes at least partly embedded in the resin.

In one application of the invention transparent quartz, which has been advantageously finely powered, is used as a filler. Also finely powered glass can be used as a filler. In addition the glass can be coloured in order to achieve a desired colour or tint in the rock product.

In one application of the method according to the invention a pigment, for example a metal oxide, is used among the resin, by which the product can be tinted, while maintaining the transparent nature of the resin.

In a preferred application of the method according to the invention a gel coating is spread on the surface of the mould, onto which the resin and the rock material is spread, before placing the resin in the mould. This gel coating can also be spread upon the smooth surface of the product which has hardened and has been removed from the mould. The gel coating smooths and polishes the final surface of the product as well as enhances the impression of depth and improves the appearance of the product corresponding to the surface of natural rock.

The method according to the invention utilizes advantageously rock materials, such as granite or gabbro, which have a reflecting surface and a hard crystal structure. Also other types of rock material mass, crushed rock materials and other similar materials can be used by the method according to the invention. Such materials include for example all kinds of crushed rock i.e. broken brick, glass cullet, granular sand, etc. These materials can also be used as various mixtures in order to achieve the desired tint.

In the method according to the invention the various rock materials and other such materials can be employed in layers in order to form various figures on the rock product, at which various texts or figures can be embedded in the surface resembling natural rock.

The rock product according to the invention comprises preferably a mixture of a mainly transparent synthetic resin and preferably also a mainly transparent filler as well as a nontransparent, opaque, preferably light reflecting, crystalline and granular rock material, the size of which granules corresponds to the natural crystal size of the crystalline rock material in question i.e. the size of the granules being larger than 1 mm, preferably from 1 to 10 mm. The mixture comprising the resin and the filler forms, while hardening, as such and without any working a smooth coating of the nontransparent product so that the product corresponds to the natural rock material with respect to its reflective properties and its impression of colour and depth. The used mixture comprises a filler which is preferably mainly transparent finely powered quartz. The proportion of the filler in the mixture, is from 10 to 90%, preferably from 40 to 60%, for example 50%, at which the synthetic resin makes up the rest of the mixture.

The coating formed by the resin and the filler is of varying thickness, because rock material granules of varying sizes are used. Thus, other rock granules are just near the surface of the coating without however breaking the smooth surface and other rock granules are further from the surface, which results in a surface imitating the surface of natural rock.

In one rock product according to the invention a gel coating is included above the surface in order to smoothen the surface and enhance the impression of depth.

In another adaptation of the invention the filler is mainly transparent finely powered quartz. In one adaptation the rock material is in a crushed form which includes for example granite or gabbro.

In one adaptation of the rock product of the invention a concrete layer has been attached to the back surface of the rock material in a firm manner forming a completely consistent layer connected smoothly with the rock material and the synthetic resin.

The natural rock material product according to the invention is based upon that a feature of the natural rock surface is to give, when polished, an impression of depth, which is due to the light penetrating and refracting within the surface within the crystalline structure of the rock. A similar refraction as that mentioned above is achieved by the rock product according to the invention and, thus, it is almost impossible to distinguish the product of the invention from polished real natural rock.

In the final rock product according to the invention the rock materials surrounded by the bonding substance of the transparent mixture have been arranged at various distances from the surface, thus, permitting light to penetrate within the mattter, which results in a natural impression of depth. Thus, the colour of the product is determined entirely according to the colour of the rock materials used and bears an unmistakable resemblance to the surface of real rock.

In addition an advantage of the invention is that although the product can be very thin, advantageously only from 2 to 4 mm, or even thicker for larger structures, the product is completely free of various fibers and other reinforcements and maintains its form unchanged. The product can be used, as such, as a durable coating material or its can be first connected to various plates which are then attached to the desired objects.

In addition, an advantage with respect to known rock products is that the product according to the invention is manufactured by moulding, at which expensive traditional working of rock becomes unnecessary. Moreover, another advantage is that the nature of the surface can be determined by the mould, at which various forms, reliefs of figures can be introduced.

A yet further advantage is that the wastes from quarries can be used as raw materials. The value of these wastes is otherwise small.

A yet further advantage is that the product according to the invention endures well various effects of weather and pollutants.

The principal objects in which the rock product of the invention can be utilized are the facades of buildings, the inner surfaces of public and private places, furnitures for example the surfaces of the tables and all other, even complex surfaces of objects that can be casted in various forms, reliefs or figures.

BRIEF DESCRIPTION OF THE DRAWINGS

The invention is explained in detail below by refering to the accompanying drawings, in which

FIG. 1 shows a rock product, according to the invention. The product 1 comprises a mixture 2 of a synthetic transparent resin and finely powered quartz. In addition the product includes granules of a rock material 3, for example granite or gabbro, which have been attached to each other into a uniform layer by the mixture. At the same time, the mixture forms a smooth coating 4 above the layer of the material. The surface of the coating 4 has been coated by a gel coating 5.

Figure 1:
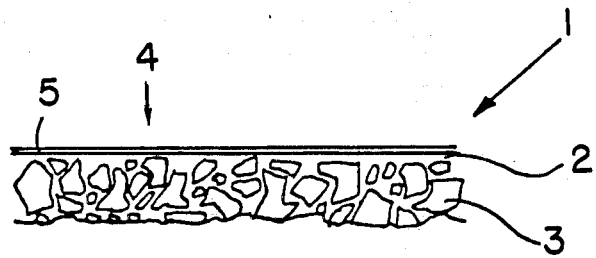
FIG. 1 shows a rock product according to the invention.

The product according to FIG. 1 can be readily used as a coating material by attaching it to the desired objects. The attachment can be achieved by utilizing glues, various mortars or the like or by means of attachment.

In addition, the product can be heated, while installing it, at which it can be bent and shaped according to the surface of the object to be covered.

Figure 2:
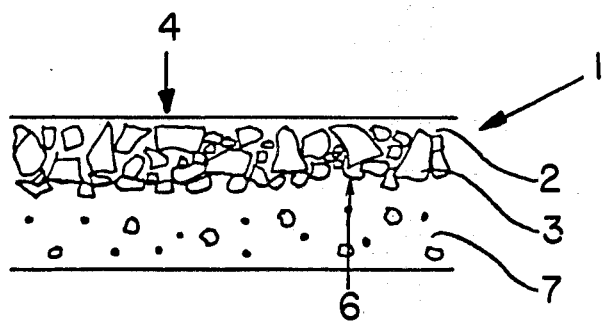
FIG. 2 shows another rock product according to the invention.

FIG. 2 shows also a rock product, according to the invention. The product 1 comprises a mixture 2 of a synthetic resin and a filler. The mixture forms a smooth and transparent coating and combines the granules of the rock material 3 with each other into a uniform layer. The granules of the rock material 3 on the back surface 6 of rock material layer are bonded to the layer so that they have been bonded to the resin only from one side, which means that they haven't been completely embeded in the resin. Thus, a layer of concrete 7 has been attached to them. This layer of concrete is attached firmly to the free surface of the rock material granules not completely embedded in the resin, which makes it possible to form a strong and uniform rock product sheet including a concrete frame. This kind of a sheet can be used as a front facade element in buildings as well as in objects of interior design.

In a prefered rock product manufacturing method according to the invention the mixture of the resin and filler is first casted in the mould. The layer of the mixture can be only for example from 2 to 3 mm thick, but even thicker if desired. Afterwards the rock material is sprinkled on the mixture into a uniform layer. This is done preferably by sprinkling only a small amount of the rock material onto each place of the mixture, after which more of the rock material is sprinkled above the resinuous surface so that a proper layer of the rock material free of the resin remains on the surface. Then the cast is shaked, pressed, squeezed or handled by other similar action in order to remove air bubbles from the mass and to ensure a smooth surface for the cast. As the mass has hardened then the loose extra rock material is removed, at which clean rock material remains on the back surface. This clean rock material adheres easily to for example concrete.

The invention has been explained above by refering to some advantageous applications of the invention. These are not meant to limit the invention in any way, as the various applications of the invention can vary within the scope of the inventive step defined by the claims.

I claim:

1. A method for manufacturing a product from a rock material characterized in that a mainly transparent synthetic resin and a nontransparent, opaque, preferably light reflecting, crystalline and granular rock material, the size of which granules corresponds to the natural size of the crystals of the rock material in question, with the granules being larger than 1 mm, are spread in a mould so that the smooth surface of the cast, formed against the surface of the mould, forms as such and without any working a smooth coating of the nontransparent product so that the product corresponds to the natural rock material with respect to its reflective properties and its impression of colour and depth.

2. A method according to claim 1 characterized in that a mainly transparent filler is mixed into the synthetic resin.

3. A method according to claim 1 characterized in that the surface of the mould is treated before the casting process by a detaching substance.

4. A method according to claim 1 characterized in that the rock material and the synthetic resin are mixed with each other and the obtained mixture is casted in the mould.

5. A method according to claim 1 characterized in that the synthetic resin with its filler is first spread on the mould surface, after which the rock material is spread over the resin.

6. A method according to claim 1 characterized in that finely powdered quartz is used as the filler.

7. A method according to claim 1 characterized in that a pigment is mixed into the resin.

8. A method according to claim 1 characterized in that a gel coating is spread on the surface of the mould, upon which the resin and the rock material are spread.

9. A method according to claim 1 characterized in that granite is used as the rock material.

10. A method according to claim 1 characterized in that gabbro is used as the rock material.

11. A method according to claim 1 characterized in that crushed rock material is used as the rock material.

12. A method according to claim 1 characterized in that a concrete layer is casted onto the back surface of the product which has hardened in the mould.

13. A product manufactured of a rock material characterized in that the product (1) comprises a mainly transparent synthetic resin as well as a nontransparent, opaque, preferably light reflecting, crystalline and granular rock material (3), the size of which granules corresponds to the natural size of the crystals of the rock material in question with the granules being larger than 1 mm so that the resin forms during its hardening as such and without any working a smooth coating (4) of the nontransparent product so that the product corresponds to the natural rock material with respect to its reflective properties and its impression of colour and depth.

14. A rock product according to claim 13 characterized in that the synthetic resin includes a mainly transparent filler.

15. A rock product according to claim 13 characterized in that a gel coating (5) has been included upon the smooth coating (4) of the product.

16. A product according to claim 13 wherein the rock material is crushed rock, crushed granite or crushed gabbro.

17. A product according to claim 13 characterized in that the filler is mainly transparent finely powdered quartz.

18. A product according to claim 13 characterized in that the product comprises a concrete layer (7) casted onto the back surface (6) of the rock material (3).

19. A method of claim 1 wherein the granule size is 1 to 10 mm.

20. A product of claim 13 wherein the granule size is 1 to 10 mm.

* * * * *